Oct. 21, 1958

L. PÉRAS 2,856,654

AUTOMATIC MACHINE FOR THE PRODUCTION
OF FOUNDRY MOULDS

Filed June 14, 1955

L. PÉRAS 2,856,654

AUTOMATIC MACHINE FOR THE PRODUCTION
OF FOUNDRY MOULDS

Filed June 14, 1955

L. PÉRAS 2,856,654

AUTOMATIC MACHINE FOR THE PRODUCTION OF FOUNDRY MOULDS

Filed June 14, 1955

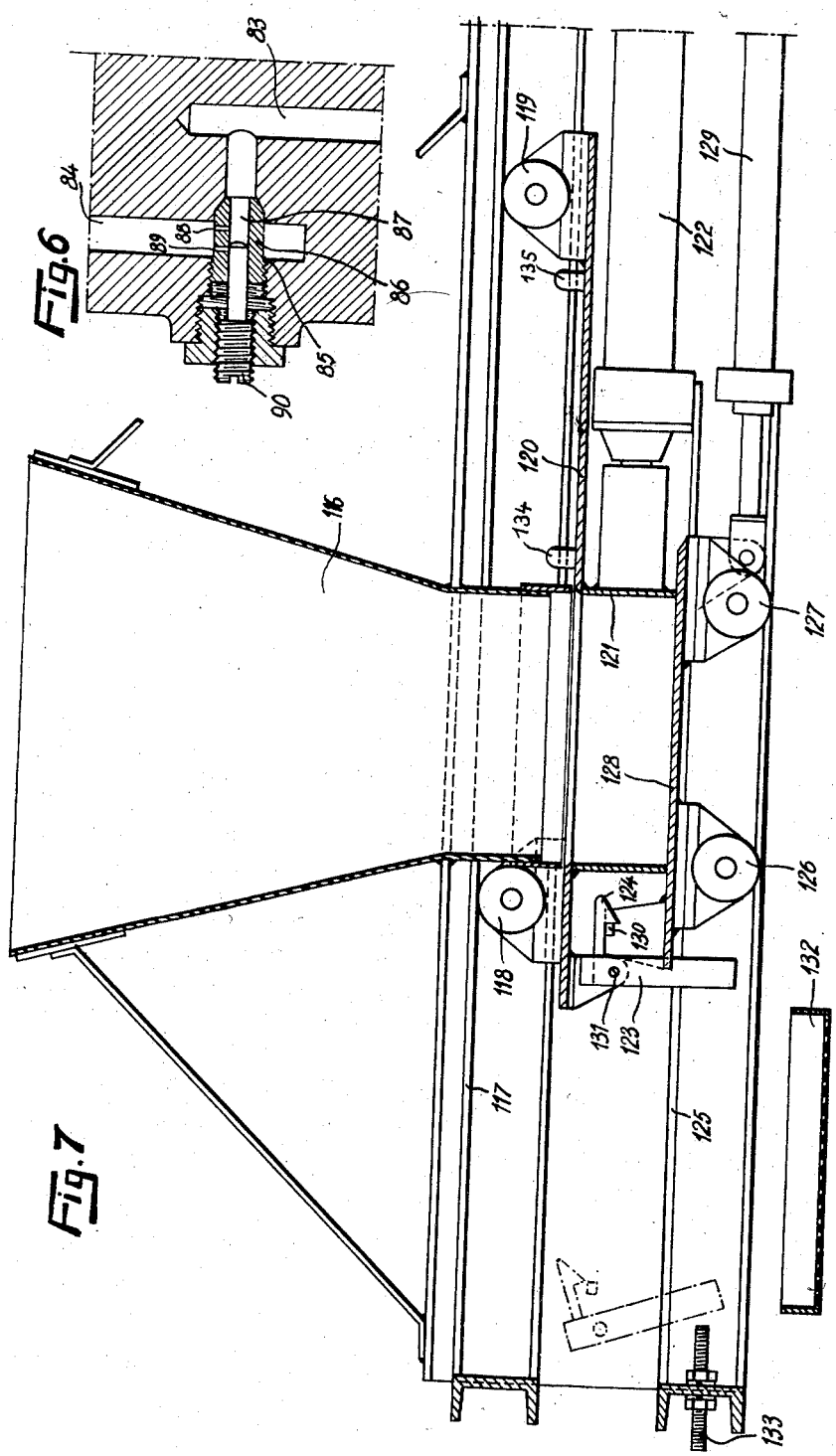

United States Patent Office 2,856,654
Patented Oct. 21, 1958

2,856,654

AUTOMATIC MACHINE FOR THE PRODUCTION OF FOUNDRY MOULDS

Lucien Péras, Billancourt, France, assignor to Regie Nationale des Usines Renault, Billancourt, France, French works under the control and the authority of the French Government Application June 14, 1955, Serial No. 515,461

Claims priority, application France July 1, 1954

5 Claims. (Cl. 22—20)

The invention relates to an automatic machine for the production of foundry moulds.

Series production in modern foundry workshops presents certain problems, more especially as regards the construction of the moulds. The latter must in fact be manufactured with the greatest accuracy, rapidly and without entailing considerable labour costs. These various requirements are met by the machine according to the invention, by means of which foundry moulds are produced according to a completely automatic cycle of operations.

The machine comprises principally a conveying element causing the rotation of the moulding box wherein the mould is to be produced, said box resting on a support surrounding the pattern plate. The conveying element, in moving, brings the moulding box successively to a device which fills it with a predetermined quantity of refractory material which is to constitute the mould and then to a surface against which the compression effort for the refractory material will be exerted. To this end, the support of the moulding box comprises a mechanism which is actuated automatically when the conveying element passes through pre-determined zones of the machine and which successively applies the moulding box against the pressure surface, produces the impression by pressing the pattern plate into the material of the mould and which effects mould removal by raising the box in accordance with a pre-determined law. The invention also relates, inter alia, to means for heating the pattern plate, devices for distributing to various operating stations fluid driving certain mechanisms, members for adjusting the mould-stripping speed, and safety members.

Among other advantages, this machine makes it possible to regulate accurately the moulding pressures and the mould-stripping times. It can be adapted easily to moulding relatively small production runs since the operations for changing the pattern plates can be carried out very rapidly. Moreover the adjustment of the machine itself needs no modifications for a great variety of different parts.

A moulding machine according to the invention, and more particularly adapted for moulding in clusters piston rings and valve seats for motor-car engines, will now be described by way of example with reference to the accompanying drawings wherein:

Fig. 6 is a view, to a larger scale, of the valve for regulating the mould stripping speeds;

Fig. 7 shows the apparatus for feeding the refractory material.

Figure 1:
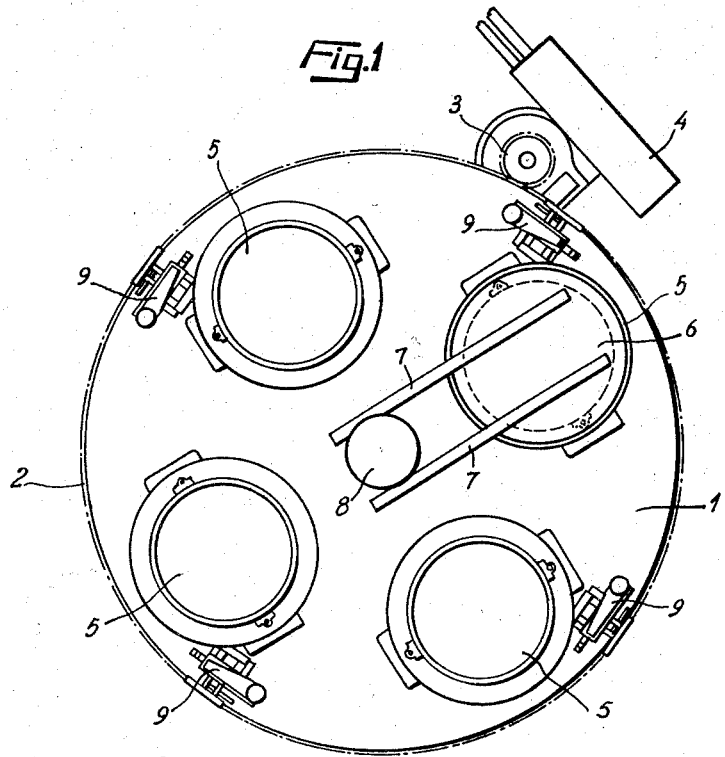
Fig. 1 is a diagrammatic plan view of the machine.

Fig. 1 is a diagrammatic plan view of the machine. The latter comprises principally a plate 1 provided on its periphery with toothing 2, the plate being driven in rotation by a pinion 3 forming part of a speed reducing gear 4 driven by a motor which is not shown. The rotary plate 1 carries "pots" 5, four in number in the example illustrated, each of said pots being intended to support a moulding box. The machine operates in such manner that a mould is produced each time that one of the four pots accomplishes a complete revolution.

To this end, the machine is surmounted by a hopper which, when the pot is in a pre-determined position, fills sand into the box which is presented to said hopper. In another zone of rotation of the pot, the pressure necessary for forming the mould is exerted by the upward movement of the box, which is then applied against the pressure plate 6 carried by the arm 7 and the column 8, the said plate rotating above a part of the rotary plate in a plane parallel thereto. The rotary plate 1 also comprises compressed air distributors 9 which are actuated by fixed cams which are not shown in the drawings (each of the distributors controlling the mechanism contained in one of the moulding pots).

Figure 2:
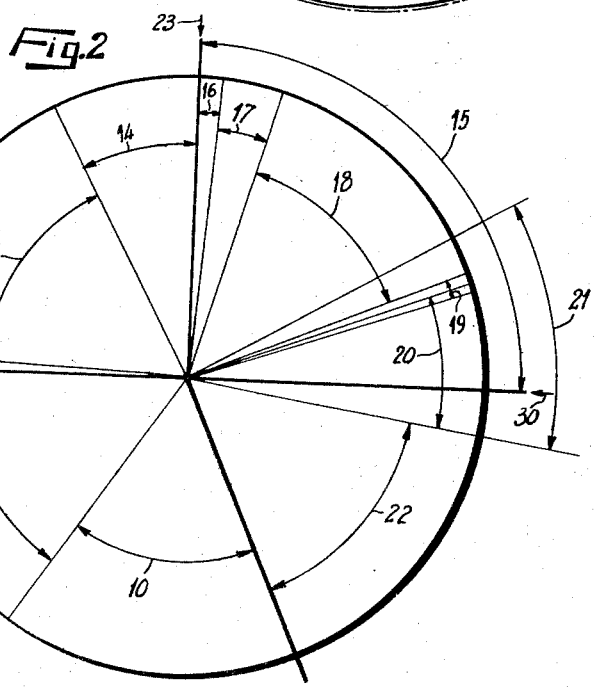
Fig. 2 is a diagram showing the operation of the machine (the movements of the arms are relative to the pots)

The diagram of Fig. 2 shows schematically the automatic cycle for producing a mould as carried out by the machine according to the invention. The rotary plate turning at a constant speed, an empty box is placed in position, by a human or mechanical operator, on a moulding pot at the time when the latter passes the sector of rotation corresponding to the arrow 10. At the same time, the operator proceeds, if necessary, to clean the pattern plate carried by the pot. Cleaning can also be effected automatically.

While the pot, thus surmounted by its box, passes through the zone 11, an electric device known per se ensures the correct positioning of the box and stops the machine if the box is not in an exactly determined position relative to the pot.

The pot then passes into the zone 12 under an apparatus for distribution of sand which will be described hereinafter.

The box, thus filled with sand, then passes through a zone 13 wherein a scraper driven in rectilinear reciprocating movement distributes the sand in the mould with a view to obtain the correct compactness of the latter, and causes excess sand to fall off.

After passing through the zone 14, which corresponds to a dead period, the pot enters the sector 15 above which moves the plate-carrying head. In a zone 16 of the plate-carrying head is carefully positioned with respect to the moulding pot and rendered integral with the said pot by means of an automatic locking device. It then accompanies the pot during its rotation through the sector 15. After passing through a dead period zone 17, wherein the head merely accompanies the pot, the latter penetrates into the zone 18 in which the mechanism contained in the moulding pot causes the pattern plate to ascend, and the moulding sand is then squeezed between the said pattern plate and the pressure plate 6 (Fig. 1).

In the zone 19 the mould-stripping operation is started by unsqueezing the pattern plate, this unsqueezing being effected, for example, by the escape of compressed air which had previously actuated the mechanism contained in the moulding pot.

Stripping is completed in the zone 20 by separating the mould from the pattern plate. This stripping period is adjustable as will be shown hereinafter. It should be noted that the sector shown schematically as 21 corresponds to the zone of operation of a vibrating device whose action is exerted on the various elements of the mould. The mould thus completed is withdrawn by the operator in zone 22. As soon as a moulding pot reaches the end of the path of travel throughout which it is accompanied by the pressure plate 6, the latter returns rapidly to the position 23 in which it takes charge of the following moulding pot.

Figure 3:
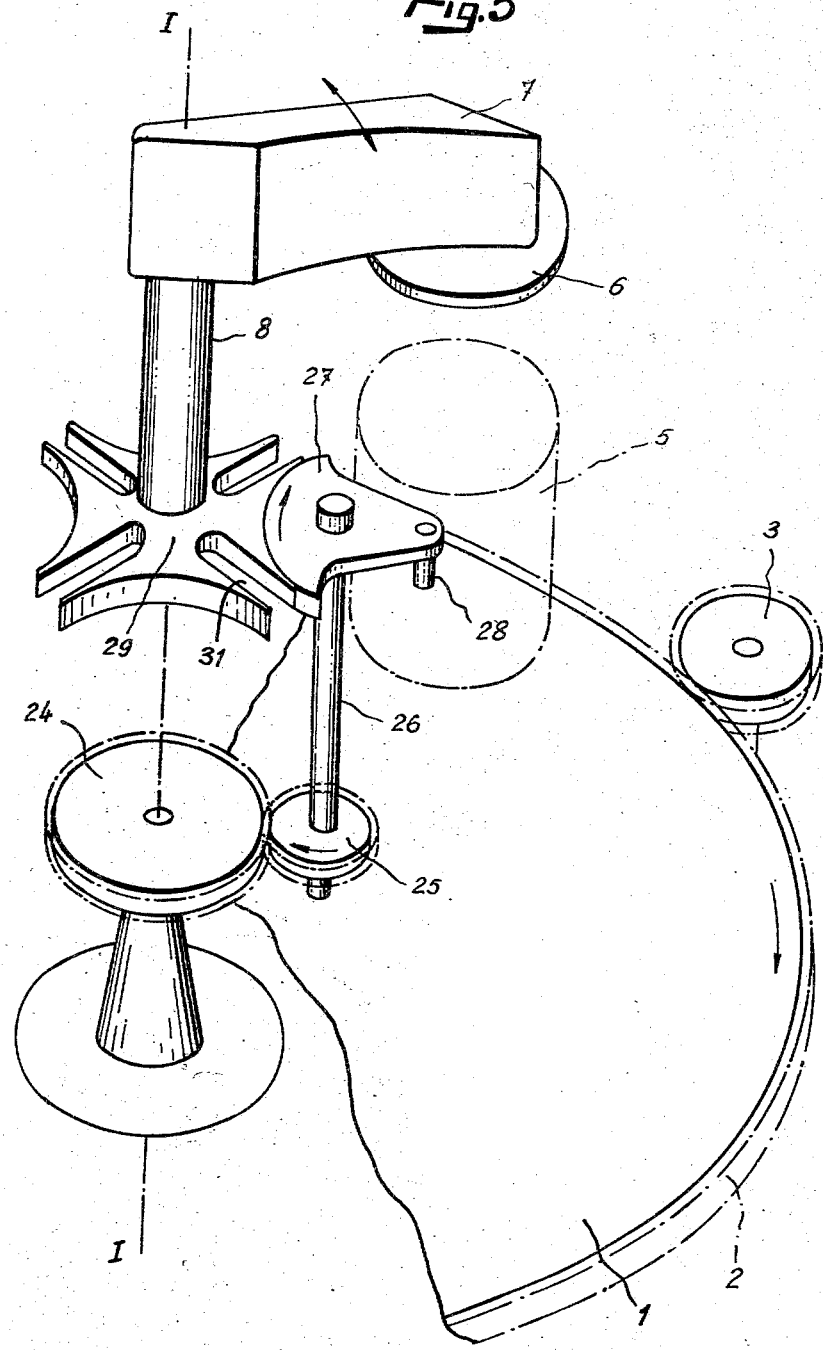
Fig. 3 represents the power transmission line of the control means of the pressure plate.

The power transmission line of the control mechanism of the pressure plate has been illustrated in Fig. 3, which shows the driving pinion 3 and the conveying plate 1 provided with its peripheral toothing 2 and carrying moulding pots such as 5. Fixed axially of the machine is a toothed wheel 24 which meshes with a pinion 25 whose shaft 26 is carried by the plate 1. The shaft 26 also carries a lever 27 provided with a finger 28 and co-operating with a Maltese cross device 29. The latter is fast with the column 8 (see Fig. 1) which is adapted to turn about the axis I—I and carries an arm 7 and the pressure plate 6. The wheel 24 is fixed in rotation.

This assembly operates in the following manner: the toothed wheel 24 has, for example, sixty-four teeth and the pinion 25 sixteen teeth, the shaft 26 performs four revolutions for one complete rotation of the plate 1. During most of one rotation of the shaft 26, the lever 27 turns but keeps the Maltese cross and the plate 1 fast with one another, so that the pressure plate 6 accompanies the moulding pots in their rotation. In fact, as has been stated hereinbefore, the column 8 is then locked with respect to the moulding pot which accompanies the plate 6, that is to say: it is locked relatively to the plate 1. When the column 8 has moved through approximately a quarter turn, i. e. when the pressure plate 6 reaches the position 30 of Fig. 2, the column 8 is unlocked and the finger 28 penetrates into one of the slots 31 of the Maltese cross. The arm 7 then suddenly carries out a rotational movement through approximately a quarter turn in the direction opposite to the rotation of the plate 1, reaches the position 23 (Fig. 2) and is once more ready to be locked and to accompany another moulding pot into the sector 15 (Fig. 2).

The employment of this latter locking and positioning device is necessary in view of the fact that the play in the various gears and the Maltese cross do not permit the centering precision required between the plate 6 and the pots 5 of the machine.

Figure 4:
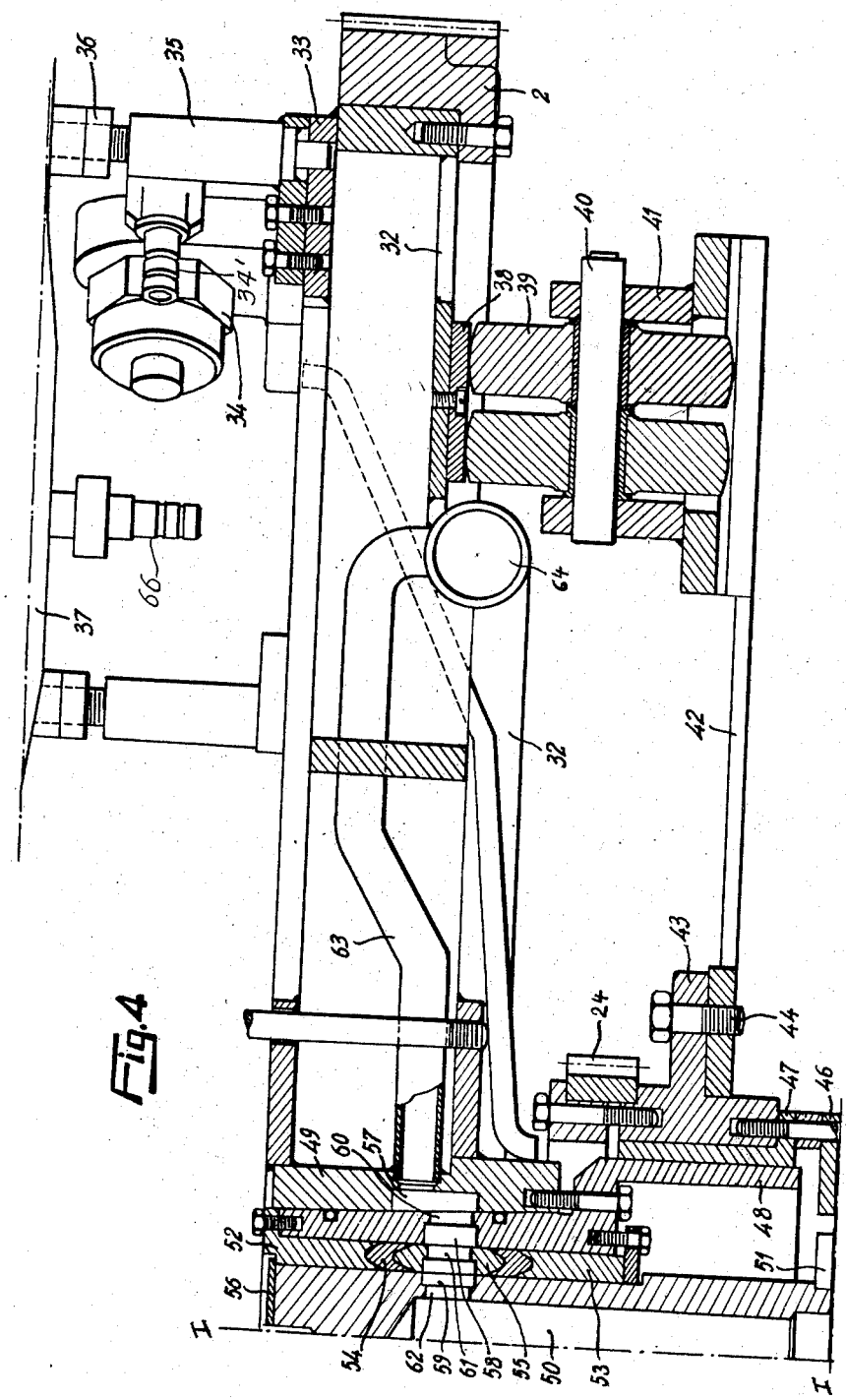
Fig. 4 is a half-section of the plate for supporting the moulding pots.

Fig. 4 indicates the members relative to the rotary plate 1. The latter comprises mainly a base member 32 supporting an intermediate plate 33 and surrounded by the toothed rim 2. The plate 33 carries on the one hand the pneumatic distributors, one of which is shown at 34, and on the other hand the plate 33 carries the moulding pots 5 by means of supports 35, adjusting screws 36 and an intermediate plate (not shown). The bottom of one of these pots has been shown schematically at 37.

The base member 32 carries a roller track 38 which moves on pairs of rollers such as 39. Each pair of rollers turns about a pin 40 carried by a bracket 41 fast with a base plate 42 fixed to the ground.

The pivoting mechanism of the assembly comprises the following elements: a plate 43 is fixed, by means of screws 44, to the base plate 42 and is fast with a plate 46. Located between this latter and a plate 43 is a ring 47 serving as a bearing for the sleeve 48 fast with the shaft 49 of the base 32.

A central hollow shaft 50 is immobilized by pins 51, the sleeve 48 and this shaft being separated by sealing means comprising the rings 52 and 53, and the stuffing-box packings 54 and 55, the ring 52 being also held by a screwed washer 56.

Formed in the shaft 49 of the base member, in the sleeve 48 and in the hollow shaft 50 respectively are circular grooves 57, 58 and 59. Communication apertures 60, 61 and 62 are provided in the sleeve 48, the stuffing-box means and in the hollow shaft 50. The bore of the latter serves as an inlet conduit for compressed air, and the succession of grooves and apertures hereinbefore described makes it possible for the air inlet to communicate with one or more conduits 63 feeding a collector 64 which supplies, passing through the distributors 34, the pneumatic devices for controlling the moulding pots.

The plate 43 also carries the toothed wheel 24 whose function has already been described hereinbefore (Fig. 3).

Figure 5:
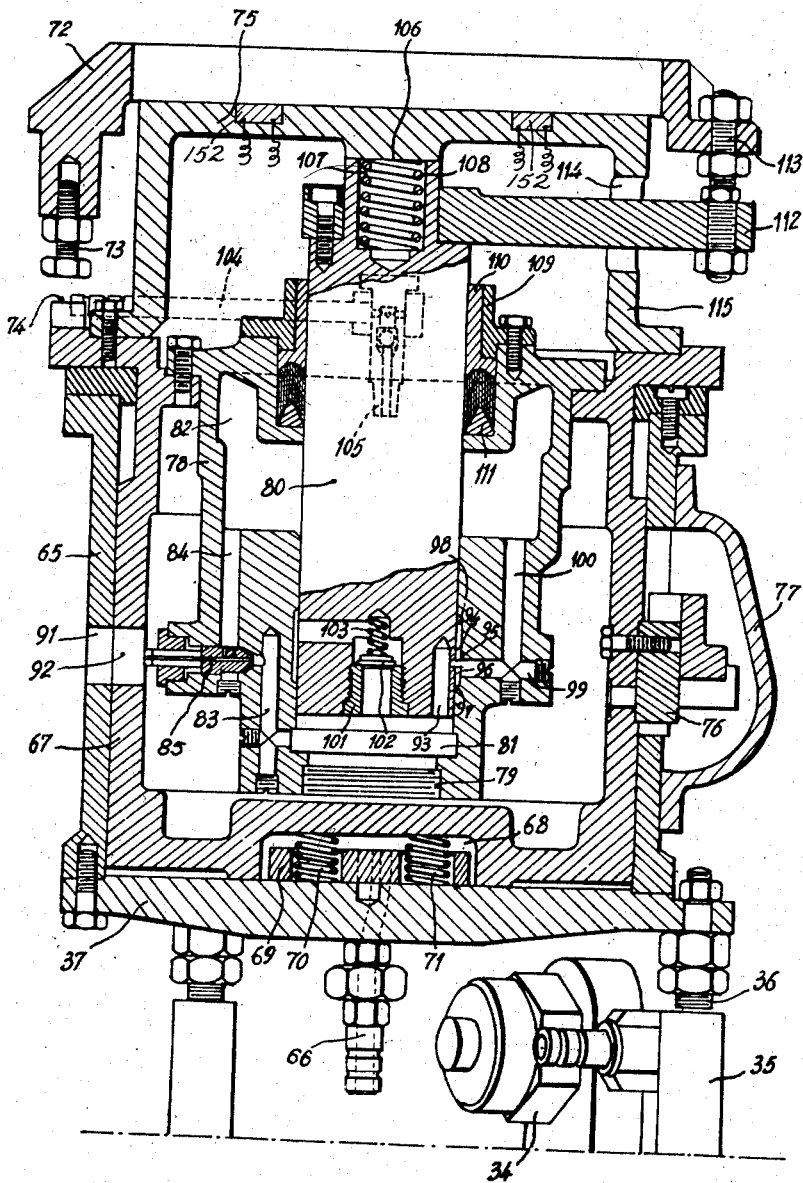
Fig. 5 is a vertical sectional view of a moulding "pot"

The moulding pots such as that which is illustrated in Fig. 5 are of known type but have certain improvements which form part of the invention. Each pot comprises a body 65 provided at its bottom portion 37 with a compressed air inlet nipple 66, connected to a nipple 34' of distributor 34 by conduit means not shown (see Fig. 4). The body 65 contains a piston known as the "ramming" piston 67 which forms with the bottom 37 a chamber 68 wherein are arranged a washer 69 and two springs 70 and 71. A frame 72 carries adjusting screws 73 which abut against the ramming piston 67 when it approaches.

The ramming piston 67 carries a cover 75 intended for supporting a pattern plate. It is guided in the body 65 by means of guide screws one of which has been shown at 76. These means prevent the ramming piston from rotating and are protected by casings 77.

Mounted within the ramming piston 67 is a hollow cylinder 78 closed at its bottom by a plug 79 and containing a piston 80 known as the "mould-stripping" piston. The hollow cylinder and the mould-stripping piston form the chamber 81. Furthermore the hollow cylinder comprises a chamber 82, which is partly filled with oil and which communicates with the chamber 81 by two different passages provided with regulating devices constituting improvements on the corresponding devices provided in pots of known types.

In the first place, the chambers 81 and 82 are connected by the conduits 83 and 84 between which is disposed an adjustable valve 85 which has been shown to a larger scale in Fig. 6. Referring now to this figure, the valve 85 comprises a body 86 closing the passage between the conduits 83 and 84, and through this body there extends longitudinally a threaded conduit 87 which is connected to the conduit 84 by orifices of small diameter, two orifices 88 and 89 for example. The flow of fluid passing through the valve is controlled by moving the screw 90 along the axis of the conduit 87, the said screw then closing the orifices 88 and 89 to a greater or less degree. Two apertures 91 and 92 (Fig. 5) formed in the walls of the body 65 and of the ramming piston 67 allow access for regulating the said valve.

Communication between the chambers 81 and 82 is further provided by the conduit 93, formed in the mould-stripping piston 80, by the four orifices 94 to 97 opening into the circular chamber 98, and by the conduits 99 and 100 provided in the thickness of the hollow cylinder 78. The position of the orifices 94 to 97 relatively to the circular chamber 98 is such that only the orifice 94 communicates with this chamber when the mould-stripping piston 80 is completely engaged in the hollow cylinder 78.

The chamber 81 also communicates with the circular chamber 98 by means of a valve comprising a body 101, a flap 102 and a restoring spring 103. Therefore communication can only be established between the two chambers for the passage of fluid in the upward direction. The part of the chamber 82 which is not occupied by oil is supplied with compressed air through a conduit 104 and a ball valve 105, fixed on cylinder 78, which prevents the compressed air from returning from the chamber 82 into the conduit 104.

The mould-stripping piston 80 abuts with its upper face 106 against the cover 75. A housing 107 containing a spring 108 is provided in the piston 80. Fluid-tightness between this piston and the hollow cylinder is ensured by a conventional stuffing-box device comprising the two rings 109 and 110 and the element 111. Finally, the mould-stripping piston 80 carries lateral supports one of which is shown at 112. The supports 112 fast with the mould-stripping piston are also fast with the frame 72 by means of threaded pins 113 and four nuts on each pin.

The relative position of the frame 72 and the supports 112 is adjusted by means of these nuts and determines the degree of compression of the mould. The supports 112 also guide the mould-stripping piston 80 relatively to the ramming piston 67, being movable in the openings 114 formed in the vertical wall 115 of the cover 75.

This mechanism operates as follows: an empty box is positioned on the frame 72, and is filled with sand, and the rotation of the conveying plate brings the moulding pot in question into the position 23 of Fig. 2. The Maltese cross mechanism previously described brings the pressure plate into this same position, the air distributor corresponding to the particular moulding pot is operated, and compressed air is admitted through the nipple 66 and raises the ramming piston 67 which carries along the assembly formed of the mould-stripping piston 80, frame 72, and moulding box (not shown), the latter coming to bear against the pressure plate which is also not shown. The frame 72 and the mould-stripping piston 80 are then blocked and the ramming piston 67 and the hollow cylinder 78 continue their upward movement, the piston 67 forcing into the sand in the box the pattern plate which is carried by the cover 75. This upward movement of the pattern plate stops as soon as the face 74 of the ramming piston comes into contact with the screws 73 of the frame carrying the moulding box. Since the hollow cylinder is in a raised position relatively to the mould-stripping piston, the volume of the chamber 81 is reduced and the conduits 93 and 99 only communicate with one another through the conduits 94, 102 and 103.

Oil is delivered into chamber 82 in view of the fact that the pressure of oil in chamber 81 is greater than the pressure of the air in chamber 82. The hollow cylinder 78 being driven by the piston 67 offers a large area to the compressed air admitted into nipple 66, whereas the inner section of the chamber 82 is much smaller, this difference in effective areas thus produces a pressure differential to displace the oil into chamber 82 from 81.

In this raised position the mould is shaken by a vibrating device (not shown) fixed to the cover 75. The vibrating device is preferably actuated by a pneumatic device (not shown), comprising a distributor and cams which are fixed with respect to the conveying plate. The cams control the starting and stopping of the vibrator in accordance with the indications of the operation diagram shown in Fig. 2.

The machine further comprises an electrical device 152 for heating the pattern plates with a view to facilitating mould-stripping. It should be noted, by way of indication, that satisfactory results have been obtained by increasing the temperature of the plates by 30° C. relatively to the ambient temperature.

As the conveying plate continues its rotation, the pot carrying the moulding box reaches the position in which, according to the diagram of operations, mould-stripping should begin. A fixed cam then operates the distributor 34 and cuts off the inlet of compressed air at the nipple 66. The outer piston 67 and all the elements which it contains or supports then fall as one unit under the effect of gravity, the shock on the bottom 37 of the body 65 being absorbed by the springs 70 and 71.

During the preceding upward movement of the hollow cylinder with respect to the inner piston, the volume of the chamber 81 was reduced, the oil contained in this chamber having been displaced on the one hand into the chamber 82 through the conduits 83 and 84, and through the conduits 99 and 100, and on the other hand into the circular chamber 98 through the valve 101. Since the ramming piston 67 has now dropped downwards once more, the frame 72 and the box which it supports are also moved downwards. Consequently, the mould-stripping piston 80 which carries the frame 72 can now move upwards, lifting the moulding box. Since the cover 75 carrying the pattern plate remains stationary, the said piston thus carries out the mould-stripping operation.

This mould-stripping travel of the mould-stripping piston 80 is effected in the following manner: since the chamber 82 is constantly supplied with compressed air by the one-way valve 105, the oil contained in this chamber and also the oil previously expelled into the conduits 84, 99 and 100 is displaced into the chamber 81 and causes the mould-stripping piston to ascend. As has been stated previously, at the beginning of this stroke only the orifice 94 provides communication between the conduits 93 and 99 and the mould-stripping speed is therefore slow at first, and increases in proportion as the orifices 95, 96 and 97 are uncovered. The stripping speed can of course also be adjusted by the screw 90 influencing the flow in the conduit 83. The spring 108 damps the shock when the mould-stripping piston 80 abuts once more against the cover 75.

The rotary plate 1 is surmounted by a feed apparatus which, in the zone 12 of the diagram of Fig. 2, fills a predetermined quantity of sand into the moulding box which is presented to the said feed device by the moulding pot passing through the said zone.

This device is shown in detail in Fig. 7. A hopper 116 containing the prepared sand, supports a framework comprising two U-section irons disposed in the same horizontal plane, one of the irons being shown at 117. Guided in each of these irons are rollers such as 118 and 119 which carry a sheet metal plate 120 and a bottomless movable container 121. This movable container is fast with the piston of a pneumatic jack 122, and further carries a lever 123 provided with a coupling hook 124.

The framework also comprises two other U-section irons one of which is shown at 125, which constitute guiding means for rollers such as 126 and 127, these rollers forming part of a carriage which carries the closure plate 128 and is fast with the jack 129. This carriage is also provided with a bar 130 over which is engaged the hook 124, which is adapted to pivot about the pin 131.

This device operates in the following manner: in the position shown in Fig. 7, the sand coming from the hopper 116 fills the movable container 121 which is closed by the plate 128. When a moulding pot reaches the position in which the moulding box carried by the said pot has to be filled with sand, a cam operates a compressed air distributor which supplies air to the jack 122. The latter then pushes the movable container 121 to the left of the figure and the container entrains the closure plate 128 against the resistance of the jack 129 which tends constantly to draw the said plate towards the right hand side of the figure.

When the movable container and the closure plate arrive above the vibrating screen 132, the hook 123 abuts against a stop screw 133 and rocks about the pin 131, this position being shown in chain-dotted lines. The hook 124 then releases the bar 130 and the jack 129 brings the closure plate 128 into its starting position. The sand present in the container 121 therefore falls onto the screen 132 and thence into the moulding box. As the plate 1 continues its rotation, a cam once more actuates the distributor for controlling the jack 122 and the said jack then pulls the container into its starting position wherein the bar 130 is once more engaged.

Whilst the movable container 121 was moved towards the screen 132, the bottom of the hopper was closed by the plate 120. A cam fast with the container actuates two contactors 134 and 135 fixed to the framework of the container and controlling a vibrating device facilitating the downward movement of the sand in the hopper 116. This vibrating device is of a known pneumatic type, not shown, and is fixed on the frame of the machine, and acts on the hopper 116.

It will be understood that the contactors 134 and 135, actuated by a cam (not shown) which is an integral part of the movable container 121, activate this device by means of a distributor which they control, and when the movable container 121 is situated in place under the hopper 116.

A scraper element not shown enters into action after the sand drops into the molding box. On the one hand it distributes and spreads out the sand in the box and in order to accomplish this it has scrapers, and on the other hand, it removes the excess or surplus sand.

What is claimed is:

1. In an automatic foundry mold-making apparatus comprising an inter-related combination operating in timed relationship, means supporting a plurality of molding boxes, means to continuously convey the molding box supporting means along a predetermined path and in predetermined spaced relationship, means to automatically fill the boxes sequentially with a predetermined quantity of refractory sand, a pressure surface, means cyclically rotating the pressure surface at the speed of the conveying means for a period less than it takes said conveying means to travel the entire path and then returning the pressure surface to a starting point, means actuating said molding box supporting means to successively move the boxes against said pressure surface to squeeze the sand therein to a predetermined pressure, produce an impression in the sand and strip the mold box clear of the supporting means, said means rotating the pressure surface comprising a first rotatable shaft carried by said conveying means, a second rotatable shaft carrying the pressure surface, a Maltese cross device on said second shaft, and means carried by said first shaft cooperating with said Maltese cross device whereby said pressure surface is alternately rotated from an initial position at the speed of the conveying means and then returned at a greater speed to said initial position.

2. In an automatic foundry mold-making apparatus comprising an inter-related combination operating in timed relationship, means supporting a plurality of molding boxes, said molding box supporting means comprising at least one molding pot, said molding pot comprising a hollow squeezing piston, a pattern plate carried by said squeezing piston, a hollow cylinder carried by said squeezing piston, a mold-stripping piston carried by said hollow cylinder, fluid means actuating said mold-stripping piston, means to continuously convey the molding box supporting means along a predetermined path and in predetermined spaced relationship, said conveying means comprising a driven rotary plate, means to automatically fill the boxes sequentially with a predetermined quantity of refractory sand, a pressure surface, said pressure surface comprising a rotatable pressure plate positioned above the level of the molding boxes when positioned on said supporting means, means cyclically rotating the pressure surface at the speed of the conveying means for a period less than it takes said conveying means to travel the entire path and then returning the pressure surface to a starting point, and means actuating said molding box supporting means to successively move the boxes against said pressure surface to squeeze the sand therein to a predetermined pressure, produce an impression in the sand and strip the mold box clear of the supporting means.

3. An apparatus according to claim 2, in which said fluid actuating means includes a plurality of fluid chambers formed by said hollow cylinder and said mold-stripping piston, means defining a plurality of conduits connecting said chambers, means to control the speed of the stripping piston, said last mentioned means comprising a valve in one of said conduits controlling the flow of fluid, means to progressively increase the speed of the piston comprising a plurality of ports in predetermined position being open selectively as the stripping piston moves.

4. An apparatus according to claim 2, further including a pattern plate and pressure plate heating means, whereby the mold box is readily stripped.

5. In an automatic foundry mold-making apparatus comprising an inter-related combination operating in timed relationship, means supporting a plurality of molding boxes, means to continuously convey the molding box supporting means along a predetermined path and in predetermined spaced relationship, means to automatically fill the boxes sequentially with a predetermined quantity of refractory sand, a pressure surface, means cyclically rotating the pressure surface at the speed of the conveying means for a period less than it takes said conveying means to travel the entire circular path and then returning the pressure surface to a starting point, means actuating said molding box supporting means to successively move the boxes against said pressure surface to squeeze the sand therein to a predetermined pressure, produce an impression in the sand and strip the mold box clear of the supporting means, said automatic filling means comprising a hopper, a movable bottomless container having a predetermined capacity opening and closing the hopper and receiving sand therefrom, means displacing the container, a carriage cooperating with said container and forming a bottom for said container, means for moving the carriage along with said container until it is in a predetermined position for filling the boxes and then withdrawing the carriage to remove the bottom from the container to fill the boxes, a pivotally mounted hook carried by said bottomless container and engaging said carriage, guide means for said carriage, and means releasing the hook from the carriage when said container is in filling position.

References Cited in the file of this patent

UNITED STATES PATENTS

| | | |
|---|---|---|
| 1,184,356 | Kramer | May 23, 1916 |
| 1,535,335 | Nicholls | Apr. 28, 1925 |
| 1,636,383 | Nicholls | July 19, 1927 |
| 1,707,411 | Nicholls | Apr. 2, 1929 |
| 1,803,117 | Lesser et al. | Apr. 28, 1931 |
| 1,832,626 | Geddes | Nov. 17, 1931 |
| 1,925,890 | Wilberz | Sept. 5, 1933 |
| 2,068,835 | Wurster | Jan. 26, 1937 |
| 2,126,738 | Corbin | Aug. 16, 1938 |
| 2,512,531 | Renkenberger | June 20, 1950 |
| 2,569,580 | Rothschild | Oct. 2, 1951 |